United States Patent

Maruyama et al.

[11] 3,791,832
[45] Feb. 12, 1974

[54] DIAZOTYPE PHOTOPRINTING MATERIAL

[75] Inventors: Shoji Maruyama, Sagamihara; Tadashi Saito, Yokohama; Shigfaki Yoshida, Yokohama; Masaru Shimada, Yokohama, all of Japan

[73] Assignee: Kabushiki Kaisha Ricoh, Tokyo, Japan

[22] Filed: Mar. 10, 1972

[21] Appl. No.: 233,756

Related U.S. Application Data

[63] Continuation-in-part of Ser. No. 821,968, May 15, 1969, Pat. No. 3,699,000.

[30] Foreign Application Priority Data

Apr. 22, 1969 Great Britain ..................... 20378/69
May 14, 1969 Germany ............................. 1924685
May 12, 1969 Netherlands ....................... 6907274

[52] U.S. Cl. .................................. 96/91 R, 96/49
[51] Int. Cl. ............................................ G03c 1/58
[58] Field of Search .......................... 96/91, 49, 75

[56] References Cited
UNITED STATES PATENTS

| | | | |
|---|---|---|---|
| 3,255,010 | 6/1966 | Sus et al. | 96/91 R |
| 2,298,444 | 10/1942 | Weissberger et al. | 96/91 R |
| 2,150,565 | 3/1939 | Schmidt et al. | 96/91 R |
| 2,516,931 | 8/1950 | Von Glahn et al. | 96/91 R |
| 3,139,341 | 6/1964 | Schlesinger | 96/91 R |
| 3,493,378 | 2/1970 | Sus | 96/91 R |
| 3,343,960 | 9/1967 | Sus | 96/91 R |

FOREIGN PATENTS OR APPLICATIONS

| | | | |
|---|---|---|---|
| 491,095 | 8/1938 | Great Britain | 96/91 R |
| 554,921 | 7/1943 | Great Britain | 96/91 R |

OTHER PUBLICATIONS

Landau, R.; "Faseicules 9 & 17 (Les Copulants)", 1962, pages 3 and 50.

*Primary Examiner*—Charles L. Bowers, Jr.

[57] ABSTRACT

This invention describes diazotype photoprinting material containing as a coupling component a compound of the formula:

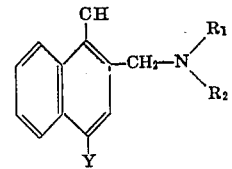

wherein $R_1$ and $R_2$ are hydrogen, alkyl, phenyl, or taken together form a heterocyclic ring and Y is an alkyl or alkoxy.

This photoprinting material gives a dense dye-image having high preservability. It could be developed by both dry and wet development methods.

5 Claims, No Drawings

DIAZOTYPE PHOTOPRINTING MATERIAL

This application is a continuation-in-part of our co-pending application Ser. No. 821,968 filed May 15, 1969, now U.S. Pat. No. 3,699,000.

BACKGROUND OF THE INVENTION

A Field of the Invention

The present invention relates to diazotype photoprinting material containing as a coupling component a compound of the following formula:

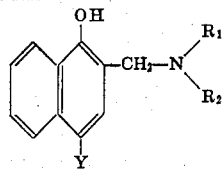

wherein $R_1$ and $R_2$ are hydrogen, alkyl radical of from one to five carbon atoms or phenyl radical, or they may be linked together with carbon, oxygen, sulfur or nitrogen atom to form a saturated five- or six-membered heterocyclic ring, and Y is an alkyl- or alkoxy radical of from one to four carbon atoms.

B. Description of the Prior Art

Though derivatives of 1-hydroxy-(4-hydroxy, alkyl or alkoxy)-naphthalene, which are used as coupling components, produce a good dark blue dye-image when coupled with suitable diazo-compounds, they are objectionable in that their solubility in water is very low and the hydroxyl group in the 1- position is so easily oxidized by the effect of the hydroxyl group, alkyl- or alkoxy radical (i.e., electron donor group) in the 4-position that the photoprinting material containing such a coupling component is readily contaminated by the oxidized coupling component. Consequently, this type of photoprinting material does not yield a good print when developed and the substrate of the printed material is easily discolored. Further, because of the low solubility of the coupling component, the production of the photoprinting material is difficult.

It is, therefore, an object of the present invention to provide a photoprinting material having good quality and containing an improved coupling component.

SUMMARY OF THE INVENTION

The present invention relates to diazotype photoprinting material containing as a coupling component a compound of the following general formula:

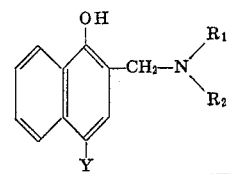

wherein $R_1$ and $R_2$ are hydrogen, an alkyl radical of from one to five carbon atoms or phenyl radical, or they may be linked together with carbon, oxygen, sulfur or nitrogen atoms to form a saturated or six-membered heterocyclic ring, and Y is an alkyl- or alkoxy radical of from one to four carbon atoms.

The coupling component gives a good dark blue dye-image when coupled with a suitable diazo-compound. It is further characterized as being quite soluble in water and exhibits a high antioxidation property. Consequently, when this coupling component is coated on a photoprinting material it advantageously provides a photoprinting material which gives a dense dye-image without contaminating the substrate (e.g., paper) of the photoprinting material after developing. Further, the image has high preservability. Moreover, this photoprinting material may be used both in dry and wet development, for example, in ammonia vapor or an alkaline aqueous solution, respectively.

The coupling components embraced within the aforesaid general formula are exemplified by the following compounds, among which the compounds having the dialkylaminomethyl substituents are preferred.

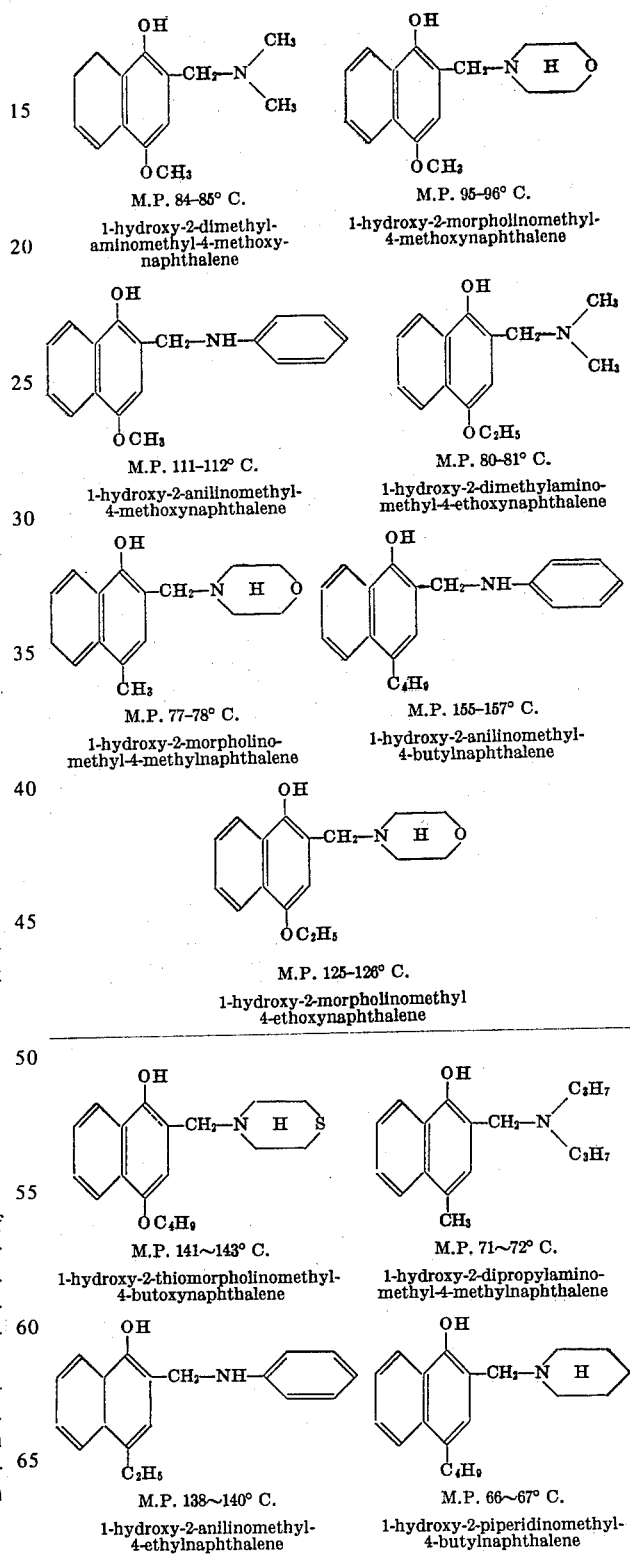

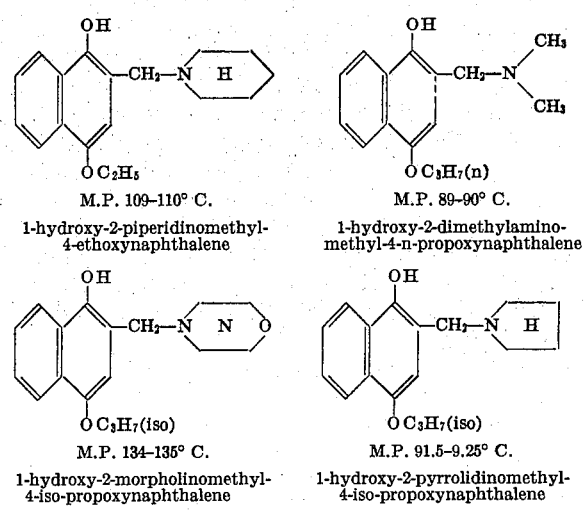

| | |
|---|---|
| OH, CH₂-N(piperidine), OC₂H₅<br>M.P. 109–110° C.<br>1-hydroxy-2-piperidinomethyl-4-ethoxynaphthalene | OH, CH₂-N(CH₃)₂, OC₃H₇(n)<br>M.P. 89–90° C.<br>1-hydroxy-2-dimethylamino-methyl-4-n-propoxynaphthalene |
| OH, CH₂-N(morpholine), OC₃H₇(iso)<br>M.P. 134–135° C.<br>1-hydroxy-2-morpholinomethyl-4-iso-propoxynaphthalene | OH, CH₂-N(pyrrolidine), OC₃H₇(iso)<br>M.P. 91.5–9.25° C.<br>1-hydroxy-2-pyrrolidinomethyl-4-iso-propoxynaphthalene |

As the coupling components of this invention are capable of forming water-soluble salts with inorganic or organic acids, a solubilizer is not required for the preparation of a photosensitive solution.

The coupling components which are used in this invention may be prepared as follows:

N,N,N′,N′-tetramethyldiaminomethane, 7.5g (0.075mol), are added in the solution of 9.4g (0.06 mol) of 1-hydroxy-4-ethoxynaphthalene in 100cc of methyl alcohol and this mixture is heated at a temperature of 50°–60°C for 1 hour. After cooling, white crystals are separated, and 9.8g of pure 1-hydroxy-2-dimethylamino-methyl-4-ethoxynapthalene (m.p. 80°–81°C) are obtained by recrystallization of said white crystals from methyl alcohol. Yield 80 percent.

In this invention, diazo-compounds having the following general formulae (1), (2) and (3) may be suitably used:

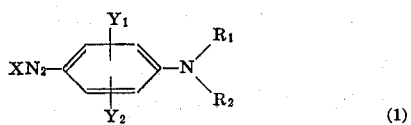

(1)

wherein $R_1$ and $R_2$ are hydrogen or a hydroxylated alkyl radical having from one to six carbon atoms in the alkyl chain or they may be linked together to form 5- or 6-membered ring, X is an acidic radical, $Y_1$ and $Y_2$ are hydrogen or lower alkoxy radical, and when both $Y_1$ and $Y_2$ are alkoxy radicals, they are substituted in the para-position.

Diazo-compounds of the general formula (1) include, for example, salts of 1-diazo-4-diethylaminobenzene, 1-diazo-2-ethoxy-4-diethylaminobenzene, 1-diazo-4-hydroxyethyl-ethylaminobenzene, 1-diazo-2,5-dimethoxy- 4-morpholinobenzene and 1-diazo-2, 5-diethoxy-4-morpholinobenzene.

Diazo-compounds (2) have the following formula:

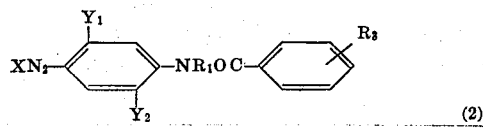

(2)

wherein X is an acidic radical, $Y_1$ and $Y_2$ are alkoxy radicals of from one to six carbon atoms, $R_1$ is hydrogen or an alkyl radical of from one to six carbon atoms, and $R_3$ is an alkoxy or alkyl radical of from one to six carbon atoms.

A diazo-compound of the general formula (2) is exemplified by the salt of 1-diazo-2, 5-diethoxy-4-(4′-methoxy)-benzoyl-aminobenzene.

Diazo-compounds (3) have the formula:

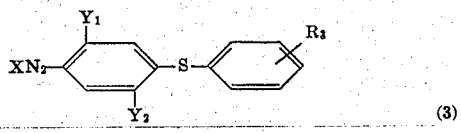

(3)

wherein X is an acidic radical, $Y_1$ and $Y_2$ are alkoxy radicals of from one to six carbon atoms, and $R_3$ is hydrogen, alkyl, or alkoxy radicals of from one to six carbon atoms.

A diazo-compound of the general formula (3) is, exemplified by the salt of 1-diazo-2,5-dimethoxy-4-(4′-methyl)-thiophenylbenzene.

The coupling components of this invention may react with other diazo-compounds. For example, they react with diazo-compounds (having tertiary nitrogen atom) derived from diazotised p-phenylenediamine to give a dense dye-image. They react with diazo-compounds having alkoxy radicals such as a methoxy, ethoxy or butoxy radical in the para-position of the benzene nucleus having the diazo group to give a stable and dense dye-image.

It is understood that the diazotype photoprinting material of this invention is obtained by coating a photosensitive solution containing the aforesaid coupling component and diazo-compound on a surface of the substrate (e.g., paper) and drying it. The photosensitive solution may contain preferably stabilizers such as inorganic acids e.g., hydrochloric acid or boric acid, organic acids, e.g., tartaric acid, citric acid or 1,3,6-naphthalene trisulfonic acid or inorganic salts, e.g., zinc chloride or aluminium sulfate and, if necessary, an organic solubilizer (or developing accelerator) such as urea, thiourea, ethylene-glycol or methylethylglycol.

DESCRIPTION OF THE PREFERRED EMBODIMENTS

The present invention is further illustrated by the following examples.

EXAMPLE 1

A photosensitive solution was prepared from the following ingredients:
 citric acid — 4.0g
 thiourea — 4.0g
 conc H₂SO₄ — 0.5 cc
 1-hydroxy-2-dimethylamino-methyl-4-methoxynaphthalene — 1.5g
 1-diazo-2,5-dibutoxy-4-morpholinobenzene chloride 1/2ZnCl₂—0.6g
 water — 100cc A diazotype photoprinting material made of said photosensitive solution, gave a dark royal purple dye-image by overlaying it on the desired-image-carrying-original, exposing it to a luminescent lamp and developing it in ammonia vapor or in an alkaline aqueous solution. The substrate of this printed material did change color after exposure to an indoor light for 30 days.

EXAMPLE 2

A photosensitive solution was prepared from the following ingredients:
 tartaric acid — 5.1g
 boric acid — 4.0g
 thiourea — 4.0g 1-hydroxy-2-piperidino methyl-4-ethoxynaphthalene — 2.0g
1-diazo-2,5-dimethoxy-4-morpholinobenzene chloride 1/2ZnCl$_2$—0.6g
water — 100cc A photoprinting material made of said photosensitive solution, gave a dense blue dye-image by treating it in the same manner as that in the Example 1 and the substrate of this printed material did not change color after exposure to an indoor light for 30 days.

EXAMPLE 3

A photosensitive solution was prepared from the following ingredients:
citric acid — 5.0g
boric; acid — 2.0g
zinc chloride — 1.0g
thiourea — 4.0g
1-hydroxy-2-morpholino-methyl-4-isopropoxy-naphthalene — 2.0g
1 diazo-4-morpholino-benzene chloride 1/2ZnCl$_2$—0.5g
water — 100cc A photoprinting material made of said photosensitive solution possessed the properties similar to the product described in Example 1.

EXAMPLE 4

A photosensitive solution was prepared from the following ingredients:
citric acid — 4.0g
conc H$_2$SO$_4$ — 0.5cc
thiourea — 4.0g
1-hydroxy-2-thiomorpholino-methyl-4-butoxynaphthalene — 1.7g
1-diazo-2,5-dibutoxy-4-morpholinobenzene chloride 1/2ZnCl$_2$—0.6g
water 100cc A photoprinting material made of said photosensitive solution possessed the properties similar to the product described in Example 1.

EXAMPLE 5

A photosensitive solution was prepared from the following ingredients:
tartaric acid — 5.1g
boric acid — 4.0g
thiourea — 4.0g
1-hydroxy-2-dipropylamino-methyl-4-methylnaphthalene — 2.2g
1-diazo-2,5-dimethoxy-4-morpholinobenzene chloride 1/2ZnClhd 2—0.6g
water — 100cc A photoprinting material made of said photosensitive solution possessed the properties similar to the product described in Example 2.

EXAMPLE 6

A photosensitive solution was prepared from the following ingredients:
citric acid — 5.0g
boric acid — 2.0g
zinc chloride — 1.0g
thiourea — 4.0g
1-hydroxy-2-anilino-4-ethylnaphthalene — 2.3g
1-diazo-4-morpholino-benzene chloride 1/2ZnCl$_2$—0.5g
water — 100cc A photoprinting material made of said photosensitive solution possessed the properties similar to the product described in Example 1.

EXAMPLE 7

A photosensitive solution was prepared from the following ingredients:
citric acid — 5.0g
conc HCl — 1.0cc
zinc chloride — 2.0g
thiourea — 1.0g
1-hydroxy-2-piperidino-methyl-4-butylnaphthalene — 2.3g
1-diazo-2-ethoxy-4-diethyl-aminobenzene chloride 1/2ZnCl$_2$—1.0g
water — 100cc A photoprinting material made of said photosensitive solution possessed the properties similar to the product described in Example 2.

What is claimed is:

1. A diazotype photoprinting material comprising a support having a photosensitive coating thereon, said coating comprising
(a) as a coupling component, a compound of the formula

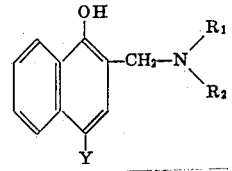

wherein $R_1$ and $R_2$ each represent a hydrogen atom, alkyl radical of from one to five carbon atoms or phenyl radical, or when $R_1$ and $R_2$ are taken together with the nitrogen atom, form a five- or six- membered saturated heterocyclic ring, said ring consisting essentially of carbon, oxygen, sulfur and nitrogen atoms, and Y is an alkoxy group containing from one to four carbon atoms;
(b) a diazonium compound and
(c) an acidic stabilizer.

2. A diazotype photoprinting material as defined in claim 1 wherein said coupling component is 1-hydroxy-2-dimethylamino-methyl-4-methoxy-naphthalene.

3. A diazotype photoprinting material as defined in claim 1 wherein said coupling component is 1-hydroxy-2-piperidinomethyl-4-ethoxynaphthalene.

4. A diazotype photoprinting material as defined in claim 1 wherein said coupling component is 1-hydroxy-2-morpholino-methyl-4-isopropoxynaphthalene.

5. A diazotype photoprinting material as defined in claim 1 wherein said coupling component is 1-hydroxy-2-thiomorpholino-methyl-4-butoxynaphthalene.

* * * * *